United States Patent [19]

Bollich

[11] Patent Number: 5,161,619

[45] Date of Patent: Nov. 10, 1992

[54] OFFSHORE POLLUTION PREVENTION DURING WELL WORK-OVER OPERATIONS

[75] Inventor: Joel L. Bollich, Covington, La.

[73] Assignee: Shell Offshore Inc., Houston, Tex.

[21] Appl. No.: 761,530

[22] Filed: Sep. 18, 1991

[51] Int. Cl.⁵ .............................................. E21B 43/36
[52] U.S. Cl. .................................... 166/357; 166/267; 166/365; 166/366
[58] Field of Search ............... 166/357, 267, 365, 366, 166/339, 351

[56] References Cited

U.S. PATENT DOCUMENTS

| | | | |
|---|---|---|---|
| 3,516,490 | 6/1970 | Smalling et al. | 166/357 |
| 3,893,918 | 7/1975 | Favret, Jr. | 210/84 |
| 4,375,835 | 3/1983 | Archer | 166/339 |
| 4,428,841 | 1/1984 | Favret, Jr. | 210/747 |
| 4,506,735 | 3/1985 | Chandot | 166/357 |
| 4,630,681 | 12/1986 | Iwamoto | 166/366 |
| 4,705,114 | 11/1987 | Schroeder et al. | 166/357 |

Primary Examiner—Hoang C. Dang

[57] ABSTRACT

Environmentally-safe work-over operations are carried out on a well of an offshore platform by transporting an auxiliary oil-and-water separator together with well work-over equipment and installing it temporarily on the platform. The large volumes of oil- or chemical-contaminated fluids generated during a well work-over operation are collected and run through the high-capacity auxiliary oil-and-water separator before being disposed of and without upsetting the performance of the regular platform separator handling the flow of production fluids from other wells on the platform.

12 Claims, 2 Drawing Sheets

OFFSHORE POLLUTION PREVENTION DURING WELL WORK-OVER OPERATIONS

BACKGROUND OF THE INVENTION

This invention is directed to a method for carrying out environmentally safe well work-over operations on a multi-well offshore platform to prevent pollution of a body of water with hydrocarbons, wherein the platform is equipped with an oil-and-water treating system of normal capacity for treating all of the hydrocarbon-bearing production well fluid flowing from all of the wells.

It is conventional in oil and/or gas drilling and production operations to collect rainwater, deck-flushing water and miscellaneous fluids such as engine oil and greases from the decks of an offshore platform. Typically, a plurality of drains are arranged throughout one or more decks of the offshore platform, especially on portions of the decks which are open and therefore exposed to the weather. Since the rainwater washes any spilled oil or grease off of the deck and into the drains, the rainwater cannot be passed directly into the ocean beneath the platform (see for example OCS order No. 7 published in the Federal Register on May 18, 1979). Instead, the collected rainwater must be treated so as to separate the oil from the water until the percentage of oil in the water reaches an acceptable level. Typically, (as the governing country's ordinances permit) as little as 48 to 72 ppm of oil is permitted in the water to be returned to the ocean beneath the platform.

During operation of the oil and/or gas processing facility, it is conventional to pass the produced fluid through a three-phase separator to divide the fluid into gas, oil and produced water and solid particles (sand) components. The produced water, however, contains enough oil, oily sand and other contaminants sometimes to require further treatment of the produced water before being returned to the surrounding ocean. As with the collected rainwater, typically, as little as 48 to 72 ppm of oil is permitted in the water and solid particles (such as sand) to be returned to the ocean beneath the platform.

Sometimes, the recovery of the oil present in the collected water from the drains and the produced water from the three-phase separator is economically worthwhile because of the value of the recovered oil. Both for pollution prevention and for economical reasons, it has been conventional to supply collected rainwater and oils from the decks of an offshore platform and the produced water from a three-phase separator to a "Skim Pile" (hereinafter skim pile) or elongate separator conduit of Engineering Specialities, Inc., Covington, La., such as is described in U.S. Pat. No. 3,893,918. A complete oil-and-water separator system as normally used on offshore platforms is described in detail in U.S. Pat. No. 4,428,841, issued to Uncas B. Favret, Jr.

Such oil-and-water separator systems are engineered, sized, designed and tuned to handle the anticipated flows of oil, gas and water from one or more wells in a manner such that any oil in the water being discharged to the ocean will be within the limits required in the environmental regulations set by the federal, state or local authorities. Any time a new well is put on production and its flow sent to the normal oil-and-gas separator, the resultant changes in the volumes of oil and water handled by the separator system may require adjustment of the separator system controls to fine-tune the separator system.

Problems arise from time to time with a platform's separator system when it is necessary to work over one or more of the wells on the offshore platform. Work-over operations may include shutting in a well, pulling the production pipe string from a well, acidizing a well, or killing a well by pumping into it water, sea water, drilling mud, completion fluid, or solutions of sodium chloride, calcium chloride, calcium bromide or zinc bromide. Large volumes of fluids which may not be compatible with those handled by the platform's oil-and-water separator system may also be generated during recompleting a new zone in a well, by producing work-over fluids when a well is first put on production, when squeezing cement during abandonment of a well, when replacing downhole equipment such as gas lift valves, or when hosing down equipment as it is withdrawn from a well.

SUMMARY OF THE INVENTION

It is an object of the present invention to provide a method for carrying out environmentally-safe well work-over operations on an offshore platform to prevent pollution of ocean waters with hydrocarbons.

A further object of this invention is to provide a method for handling and cleaning up large volumes of ocean-contaminating fluids which may be generated during well work-over operations on an offshore platform without upsetting the oil-and-water separator facilities of the platform.

An additional object of the present invention is to provide a method for supplementing the capacity of oil-and-water separating facilities on an offshore platform during work-over operations on any well of the platform to prevent discharge of contaminating liquids into the ocean.

Another object of the present invention is to provide a method for installing additional oil-and-water separator equipment on an offshore platform for handling large volumes of contaminating fluids from a well being worked over, which equipment operates independently of the regular platform separator equipment which continually handles the flow of production fluid from the other wells on the platform, and subsequently removing the installed additional separator when the work-over operation has been completed.

The present invention relates to a method of carrying out well work-over operations on a multi-well offshore platform in an environmentally-safe manner to prevent oil or other contaminating fluids from polluting the ocean. The offshore platform is provided with a conventional oil-and-water separator system which handles the normal flow of production fluid from all of the wells on the platform. In this method, where work-over operations are being carried out on one of the wells generating large volumes of ocean-contaminating fluids to be disposed of, at least one auxiliary oil-and-water separator is loaded on a barge, transferred to the offshore platform and installed on the platform in the vicinity of the well being worked over. All fluids used in the work-over operations, or those that come from the work-over well or are spilled in the vicinity thereof, are collected and run to the auxiliary oil-and-gas separator. Oil from the auxiliary separator is subsequently piped into the regular separator system of the platform. The water phase may be dumped into the ocean after the auxiliary separator has reduced the oil content to environmentally-acceptable levels or may be further cleaned up in the platform separator system. Certain heavy fluids, such as zinc bromide, which are not permitted to be dumped into the ocean, are collected in suitable containers and barged to shore.

After the well work-over operation has been completed, the removable auxiliary oil-and-water separtor is disconnected from the offshore platform and from the equipment thereon and is lowered to a barge, together with other work-over equipment, and transported to another location, or stored.

DESCRIPTION OF THE INVENTION

Figure 1:
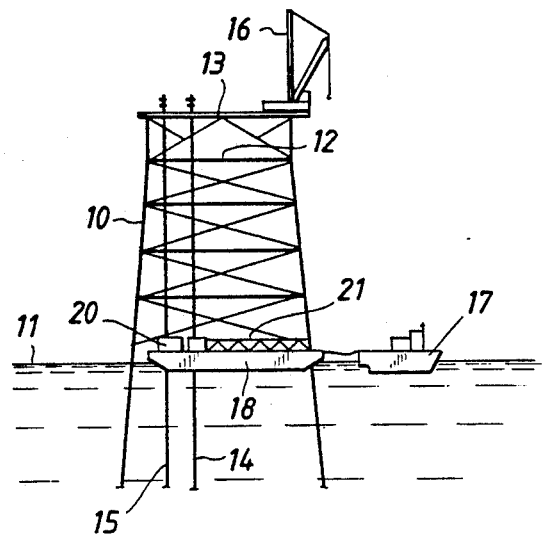
FIG. 1 is a diagrammatic view of an offshore platform having a plurality of wells installed thereon.

Referring to FIG. 1 of the drawing, a portion of an offshore platform 10 is shown as extending above the surface of a body of water 11. The platform is equipped with at least a pair of decks 12 and 13 and has a pair of wells 14 and 15 extending from above the deck 13 down through the platform and into the body of water 11. The upper deck 13 is also provided with a crane or hoist 16 for lifting loads from the ocean surface and depositing them on the decks. A tugboat 17 is shown as being positioned near the platform 10 and is connected to a barge 18. The barge 18 is used to haul work-over well equipment to the platform. For ease of illustration, an auxiliary oil-and-water separator 20 and a derrick 21 used in work-over operations is shown.

Figure 2:
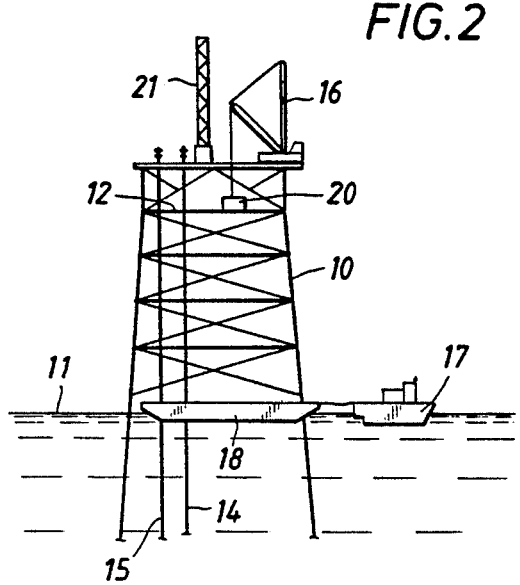
FIG. 2 is a diagrammatic view of the platform of FIG. 1 where work-over equipment is being unloaded from a vessel and hoisted to certain decks of the platform.

In FIG. 2, the work-over derrick 21 is shown as being mounted on the upper deck 13 and the crane 16 is shown as hoisting the auxiliary separator 20 to the lower deck 12 of the platform 10. Depending upon the type of work-over equipment used and the type of work-over operations being carried out, the derrick 21 may be positioned adjacent one of the wells 14, as illustrated, or may be positioned over the well.

Figure 3:
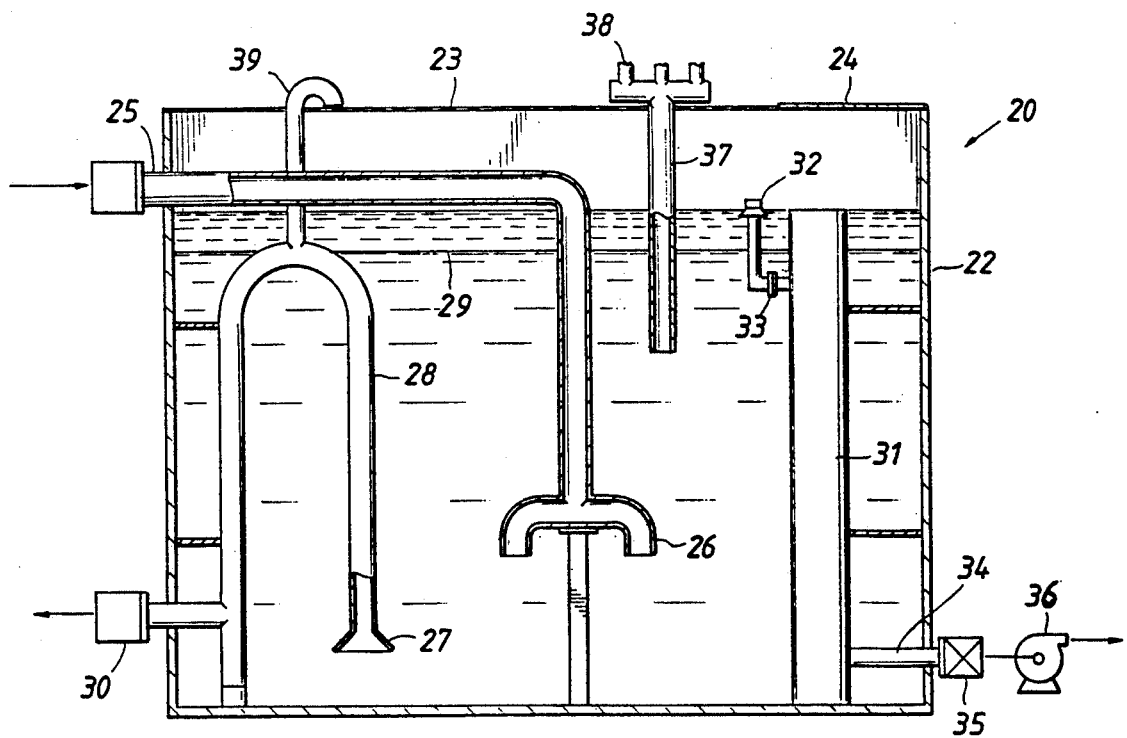
FIG. 3 is a diagrammatic view, taken in partial cross section, of one form of an auxiliary oil-and-water separator which may be employed in carrying out the method of the present invention.

Referring to FIG. 3 of the drawing, one suitable form of an auxiliary separator 20 is shown as comprising a suitable vessel 22 of adequate capacity, say from 50 to 100 barrels. The open top of the vessel 22 may be closed by a grid 23 having a manhole or hatchway 24 therein. The vessel 22 is provided with an inlet fluid flow line 25 through which the fluids generated in the work-over operation flow into the vessel 22. The discharge end 26 of line 25 is positioned above the draw-off level 27 which forms the entrance for the clean fluid line, say water, which line 28 extends in a loop above the oil/gas/water interface in the vessel 22 and then downwardly to the discharge through port 30 from the vessel. Water discharged at this point is substantially free of any oil.

In another portion of the vessel 22, the vessel is provided with a weir 31 which may be in the form of a vertically positioned elongated pipe, say 10 inches in diameter. The upper end of the weir 31 is positioned at a level where it is desired to draw off the oil that collects at the top of the tank. The weir 31 may also be provided with a swivel skimmer 32 of the type well known to the art which may be attached to the wall of the weir by means of a swivel joint 33. The bottom of the weir 31 is provided at the lower end but preferably above the end thereof with a discharge oil conduit or pipe 34 adapted to be closed by a valve 35 and connected to a pump 36 for pumping the separated oil to a skim tank or a wet oil tank. The tank or vessel 22 may also be provided with one or more inlet lines 37 having individual lines 38 which come from any of the various drains in the floors around the well being worked over.

Figure 4:
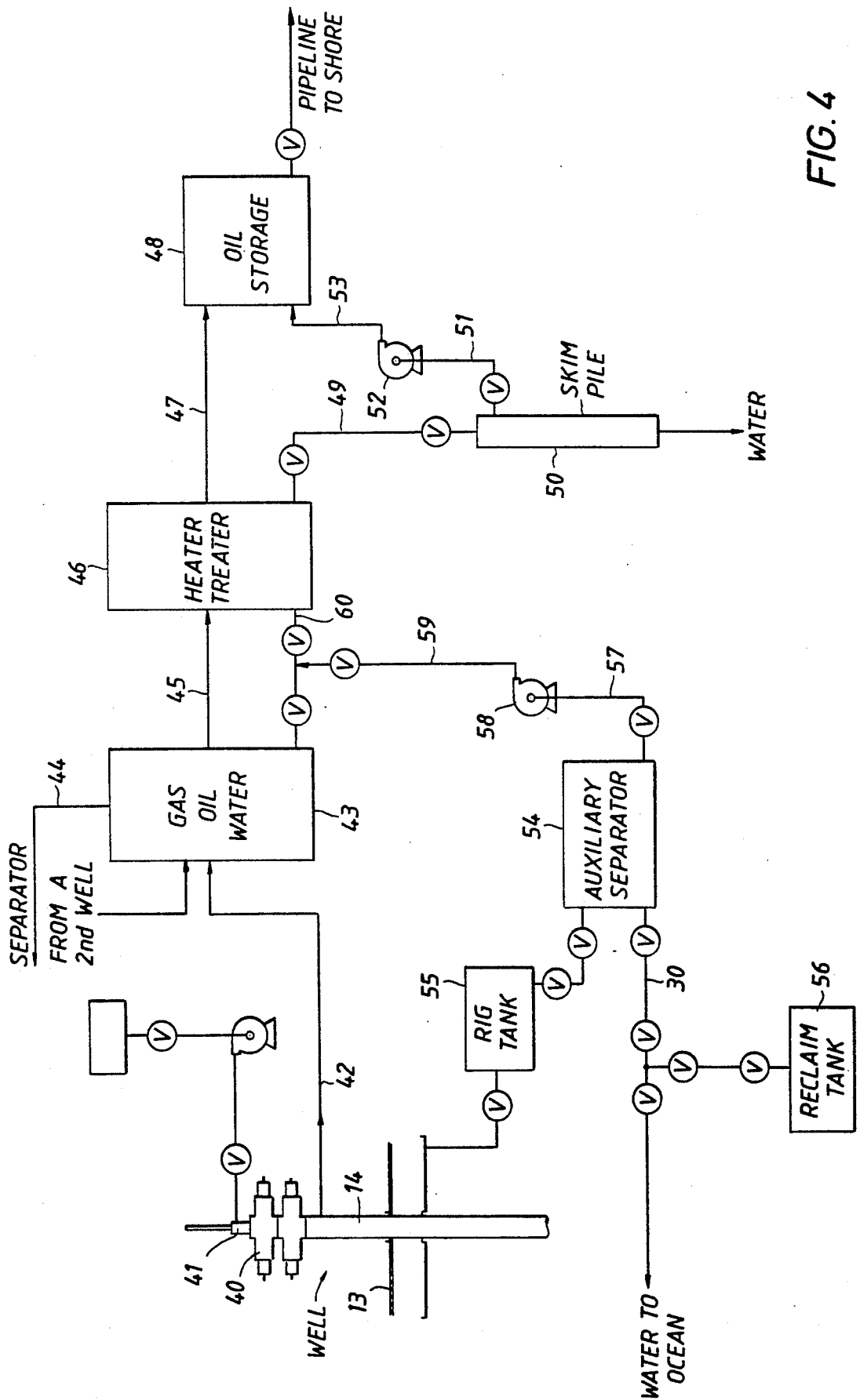
FIG. 4 is a schematic representation of a flow diagram of oil-and-water separator equipment on an offshore platform during well work-over operations.

A typical well 14 is shown as being positioned above the deck 13 in FIG. 4. The top of the well is closed by blowout preventers 40 and/or a christmas tree 41. Well production fluid may flow from the well 14 through conduit 42 to a gas, oil and water separator 43. The gas from the separator 43 would be let off through flow line 44 while a mixture of oil and water would pass through flow line 45 to a heater treater unit 46. Oil from the heater treater 46 would pass through flow line 47 to an oil storage tank 48. The water phase from the heater treater would flow from the bottom thereof through flow line 49 to a skim pile 50 where any small amount of water left in the oil phase would be separated out and later pumped through flow line 51, pump 52, and flow line 53 into the oil storage tank 48. The clean water would be discharged through the bottom of the skim pile 50.

Water clean-up equipment of this type and modifications thereof are shown in U.S. Pat. No. 4,428,841 issued to Uncas B. Favret, Jr. All of the equipment is well known to the art. The present invention makes use of an auxiliary oil-and-water separator 54 which may be of the type shown in FIG. 3 of the drawing. Additionally, instead of running fluids generated during a work-over operation directly from the fluid drains to the auxiliary separator 54, a rig tank or a holding tank 55 may be used to collect contaminating work-over fluids prior to their being piped to the separator 54. Water which has had all contaminating oil removed from it is let off the bottom of the separator 54 through flow line 30 and is discharged into the ocean. In the event that certain heavy fluids are recovered that cannot be discharged into the ocean, the present equipment added to the platform includes a reclaim tank 56 into which fluids could be run and later transported to shore on a barge to be claimed or otherwise suitably disposed of. Oil that is separated in the auxiliary separator 54 would be discharged near the bottom of the separator and through flow line 57, pump 58, flow lines 59 and 60, be transferred to the heater treater unit 46 of the regular equipment used on the platform for treating normal production fluids.

Again referring to FIG. 3, the clean fluid discharge line 28 is provided with an air vent at the top of the loop.

By making use of the equipment described hereinabove with regard to FIGS. 1 through 4, a method is provided for carrying out environmentally safe well work-over operations on a multi-well offshore platform so as to prevent pollution of the ocean waters with hydrocarbons. It is to be understood that the offshore platform is equipped with an oil-and-water treating system including suitable permanent equipment for removing oil from normal production well fluids generated by the several wells on the platform. According to the present invention, suitable work-over equipment and an auxiliary selectively-moveable oil-and-water separator is loaded on a vessel and moved to its offshore platform location as shown in FIG. 1. By means of a crane 16 on the platform, the work-over equipment is hoisted to the deck of the platform and positioned adjacent or over the well to be worked over. The auxiliary separator 20 is also hoisted to the top of the platform or to a deck 12 lower than the upper deck of the platform in order to get a gravity feed of fluid into the separator 20. The work-over equipment is assembled in the vicinity of the well to be worked over and is arranged in an operational manner on the platform. The auxiliary oil-and-water water separator 20 is also connected in flow communication with the permanent oil-and-water treating system on the platform at a point upstream thereof.

The work-over operation is then carried out. As previously described, this operation may include shutting in of a well, pulling the production pipe string from the well, acidizing a well or killing a well by pumping into it water, sea water, drilling mud, completion fluid, or solutions of sodium chloride, calcium chloride, calcium bromide or zinc bromide. During the operation, all hydrocarbon-contaminated work-over fluids that are spilled and recovered during the work-over operation are collected and run to a collection or rig tank 55 or directly into the auxiliary separator 54. The oil and water mixture is preferably introduced into the auxiliary separator 20 at a point in the tank below the oil layer at the top and the clean water layer at the bottom so that oil is not mixed into the clean water layer being discharged out of the separator.

As shown in FIG. 4 of the drawing, the oil is run from the separator 54 to the pump 58 which delivers it into the normal water treating system of the platform.

After work-over operations in the well have been completed, all of the oil is pumped out of the auxiliary separator and all of the clean water in the separator is discharged to the ocean unless further cleanup is needed in which case it could be run to the skim pile 50 (FIG. 4) of the permanent equipment on the platform. As previously pointed out, if the water phase being discharged from the auxiliary separator 54 contains a weighting solution such as zinc bromide which is not allowed to be discharged into the ocean, the water phase would be run to the reclaiming tank 56.

With the work-over operations completed, the auxiliary separator 54, rig tank 55, reclaiming tank 56 and any other equipment used in the work-over operations such as the derrick 21, would be disconnected and lowered back to the barge 18 (FIGS. 1 and 2). The equipment would then be moved to shore and any necessary treatment or separation of the material in the reclaiming tank would be carried out. In some cases, a formation treating acid may have been introduced into the well to treat the oil producing formation during the work-over operation. When this material is flushed back to the surface some of it may have to be neutralized in a manner well known to the art.

What is claimed is:

1. A method for carrying out environmentally safe well work-over operations on a multi-well offshore platform to prevent pollution of a body of water with hydrocarbons, where the platform is permanently equipped with an oil-and-water treating system including normal-capacity oil-and-water treating equipment for treating the hydrocarbon-bearing production well fluid, said method comprising:

loading work-over equipment and an auxiliary selectively-moveable oil-and-water separator on a vessel and moving it to the offshore platform;

transferring the work-over equipment and the auxiliary oil-and-water separator to a deck of the offshore platform;

assembling the work-over equipment in an operational manner on said platform;

connecting the auxiliary oil-and-water separator in flow communication with a permanent oil-and-water treating system on the platform at a point upstream thereof;

carrying out work-over operations on a well;

collecting all hydrocarbon-contaminated work-over fluids spilled and recovered during the work-over operations;

flowing the collected fluids into the auxiliary oil-and-water separator where the fluids are separated into an oil phase and a water phase;

flowing the oil phase through the permanent oil-and-water treating system on said platform;

disposing of the water phase from the auxiliary oil-and-water separator;

terminating work-over operations on the well;

disconnecting the auxiliary separator from the permanent oil-and-water treating system on said platform; and removing the well work-over equipment and the auxiliary oil-and-water separator from the platform.

2. The method of claim 1 wherein the water phase in the auxiliary oil-and-water separator is run into the ocean when oil in the water phase is less than that specified by environmental regulations.

3. The method of claim 1 wherein the step of carrying out work-over operations on the well includes the step of providing blowout preventers at the top of the well if the well is pressurized.

4. The method of claim 1 wherein the step of carrying out work-over operations includes the step of flushing the well with sea water.

5. The method of claim 1 wherein the step of carrying out work-over operations includes the steps of introducing a formation treating acid into the well and subsequently flushing the hydrocarbon-contaminated acid out of the well and collecting it for transfer to the auxiliary oil-and-water separator.

6. The method of claim 1 wherein the step of carrying out work-over operations includes the steps of introducing a heavy fluid containing a weighting agent into the well and subsequently removing it from the well.

7. The method of claim 6 wherein the weighting agent is zinc bromide.

8. The method of claim 7 wherein the water phase of the auxiliary oil-and-water separator is transferred to a storage container for transfer to shore.

9. The method of claim 1 wherein the water phase of the auxiliary oil-and-water separator is transferred to a storage container when the water phase contains any material not environmentally acceptable in the ocean.

10. The method of claim 6 wherein the weighting agent is calcium chloride.

11. The method of claim 1 wherein the step of collecting all hydrocarbon-contaminated work-over fluids includes all of the fluids, including rainwater, used to flush equipment and operating areas, which fluids flow down normal drain lines of the platform.

12. A method for carrying out environmentally safe well work-over operations on a multi-well offshore platform to prevent pollution of a body of water with hydrocarbons, said method comprising:

loading work-over equipment and an auxiliary selectively-moveable oil-and-water separator on a vessel and moving it to the offshore platform;

transferring the work-over equipment and the auxiliary oil-and-water separator to a deck of the offshore platform;

assembling the work-over equipment in an operational manner in the vicinity of one of the wells on said platform;

connecting the auxiliary oil-and-water separator in flow communication with floor drains around the well to be worked over;

carrying out work-over operations on a well;

collecting all hydrocarbon-contaminated work-over fluids spilled and recovered during the work-over operations;

flowing the collected fluids into the auxiliary oil-and-water separator where the fluids are separated into an oil phase and a water phase;

flowing the oil phase to other oil-and-water treating equipment on said platform;

disposing of the water phase from the auxiliary oil-and-water separator;

terminating work-over operations on the well;

disconnecting the auxiliary separator from the platform; and removing the well work-over equipment and the auxiliary oil-and-water separator from the platform.

* * * * *